United States Patent
Tsukamoto et al.

(10) Patent No.: US 6,225,613 B1
(45) Date of Patent: May 1, 2001

(54) OPTICAL DEVICE PROVIDED WITH CORRECTING FUNCTION FOR TREMBLING OF FOCUSED IMAGE WITH A STOP OF POWER SUPPLY TO THE DEVICE

(75) Inventors: Shinji Tsukamoto, Saitama; Ken Hirunuma, Tokyo, both of (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/318,825

(22) Filed: May 26, 1999

(30) Foreign Application Priority Data

Jun. 8, 1998 (JP) .................................................. 10-158835

(51) Int. Cl.$^7$ ...................................................... G02B 7/04
(52) U.S. Cl. .................................. 250/201.2; 250/208.1; 396/52
(58) Field of Search .............................. 250/201.2, 201.4, 250/208.1; 359/554–557, 694, 693; 396/52–55, 111

(56) References Cited

U.S. PATENT DOCUMENTS

| 4,936,664 | 6/1990 | Haraguchi et al. . |
| 4,970,540 | 11/1990 | Vasey et al. . |
| 5,194,888 | * 3/1993 | Akashi et al. ........................... 396/54 |
| 5,305,040 | 4/1994 | Enomoto . |
| 5,461,513 | 10/1995 | Maruyama ............................. 359/837 |
| 5,754,339 | 5/1998 | Kanai et al. .......................... 359/557 |
| 5,831,671 | 11/1998 | Chigira et al. ......................... 348/208 |

FOREIGN PATENT DOCUMENTS

| 6-43365 | 2/1994 | (JP) . |
| 6308431 | 11/1994 | (JP) . |
| 10-20213 | 1/1998 | (JP) . |
| 10186228 | 7/1998 | (JP) . |

* cited by examiner

Primary Examiner—Que T. Le
(74) Attorney, Agent, or Firm—Greenblum & Bernstein, P.L.C.

(57) ABSTRACT

An optical device comprises correction lenses for correcting a tremble of a focused image. The correction lenses are held by a lateral-direction driving frame which is held by a lengthwise-direction driving frame. The frames are respectively moved by a lengthwise-direction actuator and a lateral-direction actuator. When a power switch of the optical device is turned OFF, motors of the actuators are driven such that the driving frames are respectively moved to reset positions. Further, differences between the reset positions and moving center positions are read from an EEPROM, and the motors of the actuators are driven based on the differences, such that the frames are respectively moved to the moving center positions. Then, the motors are stopped, and a power supply to the optical device is stopped.

16 Claims, 8 Drawing Sheets

OPTICAL DEVICE PROVIDED WITH CORRECTING FUNCTION FOR TREMBLING OF FOCUSED IMAGE WITH A STOP OF POWER SUPPLY TO THE DEVICE

BACKGROUND OF THE INVENTION

1. Field of the Invention

The present invention relates to an optical device, which is provided with a tremble preventing apparatus, to correct trembling caused by a hand tremble and so on.

2. Description of the Related Art

Conventionally, an optical device, for example, a pair of binoculars, is provided with a tremble preventing apparatus for performing a tremble preventing operation by which a tremble of a focused image, due to a hand tremble and so on, is corrected. The tremble preventing apparatus includes correcting optical systems. When the tremble of the focused image occurs due to hand tremble, the correcting optical systems are driven from a position, at which optical axes of the correcting optical systems are respectively coaxial with optical axes of other optical systems of the optical device, in a direction and by an amount such that a movement of the optical device is canceled, so that the tremble of the focused image is corrected. Note that the position is referred to as a "moving center position" hereinafter. In the optical device, the correcting optical systems are initialized at the moving center position, before starting the aforementioned tremble preventing operation.

For initialization, the correcting optical systems are driven to the moving center position after a supply of a power is started and before a tremble preventing switch, for starting and stopping the tremble preventing operation, is turned ON. The driving of the correcting optical systems to the moving center position is not performed when the supply of the power is stopped.

If the optical device is a single-lens reflex camera, an object can be viewed through a finder while the power is not supplied. Namely, there is a problem that an actual object image viewed by a user does not coincide with a theoretical (desired) object image that lies on an optical axis of a lens barrel of the single-lens reflex camera.

Further, there is a telescope or a pair of binoculars including the above-mentioned tremble preventing apparatus. Such an optical device is provided with a single switch for both a power switch and a tremble preventing switch. When the optical device is mounted on a tripod and so on, it can be used with the tremble preventing switch, namely the power switch, being OFF, as the tremble does not occur. Accordingly, there is a problem that an actual object image viewed through the eyepiece(s) does not coincide with a theoretical (desired) object image that lies on an optical axis of a lens barrel of the optical device.

SUMMARY OF THE INVENTION

Therefore, an object of the present invention is to provide an optical device by which an actual object image coincide with a theoretical (desired) object image that lies on an optical axis of a lens barrel.

In accordance with an aspect of the present invention, there is provided an optical device, provided with a tremble preventing function, comprising: a detector that detects an amount of an optical device tremble; a correcting optical system that corrects a tremble of a focused image due to the optical device tremble; and a driving system that drives the correcting optical system in two directions on a plane perpendicular to an optical axis of the correcting optical system, such that the optical device tremble amount is canceled when a tremble preventing operation is performed, and the driving system maintains a position of the correcting optical system when a power supply to the optical device is stopped.

The correcting optical system is driven to a moving center position such that the optical axis of the correcting optical system coincides with an optical axis of another optical system of the optical device, when the power supply to the optical device is stopped.

The optical device further comprises a reset position detector that detects whether the correcting optical system is positioned at a reset position at which the optical axis of the correcting optical system is substantially coaxial with the optical axis of another optical system. The correcting optical system is driven to the reset position, before being driven to the moving center position.

The optical device further comprises a memory system that stores difference data indicating a difference between the reset position and the moving center position.

The correcting optical system is driven to the moving center position based on a comparison of the reset position detector and the difference data.

Preferably, the memory system is an erasable and programmable nonvolatile memory.

Each of the two directions has the reset position detector, and the difference data of each of the two directions is stored in the memory system.

The reset position detector comprises: a photo-interrupter that includes a light-emitting element and a photoreceptor element; and a thin plate. A change of positional relationship between the photo-interrupter and the thin plate is detected based on, whether a luminance flux, outputted from the light-emitting element, is inputted to the photoreceptor element, or whether an amount of the luminance flux inputted to the photoreceptor element changes.

Preferably, the photo-interrupter is a transmission-type photo-interrupter in which the light-emitting element and the photoreceptor element are disposed facing each other separated by a predetermined interval, and the thin plate is interposed between the light-emitting element and the photoreceptor element.

Preferably, the photo-interrupter is a reflection-type photo-interrupter in which the light-emitting element and the photoreceptor element are disposed such that a light emitting surface of the light-emitting element and a light receiving surface of the photoreceptor element face substantially a same direction, and the thin plate faces the light emitting surface and the light receiving surface.

Optionally, the thin plate is immovably fixed, and the photo-interrupter moves in accordance with the driving of the correcting optical system. Further, optionally, the photo-interrupter is immovably fixed, and the thin plate moves in accordance with the driving of the correcting optical system.

The driving system comprises: a motor that is mounted in a motor case; and a shaft that moves in a longitudinal direction thereof, in accordance with a rotational direction of the motor, to move the correcting optical system. A thread is formed on the shaft, and a female thread, that securely engages the shaft thread, is formed on an inner wall of the motor case, the motor being unable to rotate due to the secure engagement when the power supply to the optical device is stopped, so that the correcting optical system is fixedly disposed at the moving center position.

The optical device further comprises a tremble preventing switch which starts and ends the tremble preventing operation. The correcting optical system is driven to the moving center position, when the tremble preventing switch is turned OFF.

In accordance with an aspect of the present invention, an optical device provided with a tremble preventing function, comprises: a detector that detects an amount of an optical device tremble; a correcting optical system that corrects a tremble of a focused image due to the optical device tremble; and a driving system that drives the correcting optical system two-dimensionally on a plane perpendicular to optical axis of the correcting optical system.

The optical axis of the correcting optical system actually coincides with an optical axis of another optical system of the optical device, when a power supply to the optical device is stopped.

DESCRIPTION OF THE PREFERRED EMBODIMENTS

Figure 1:
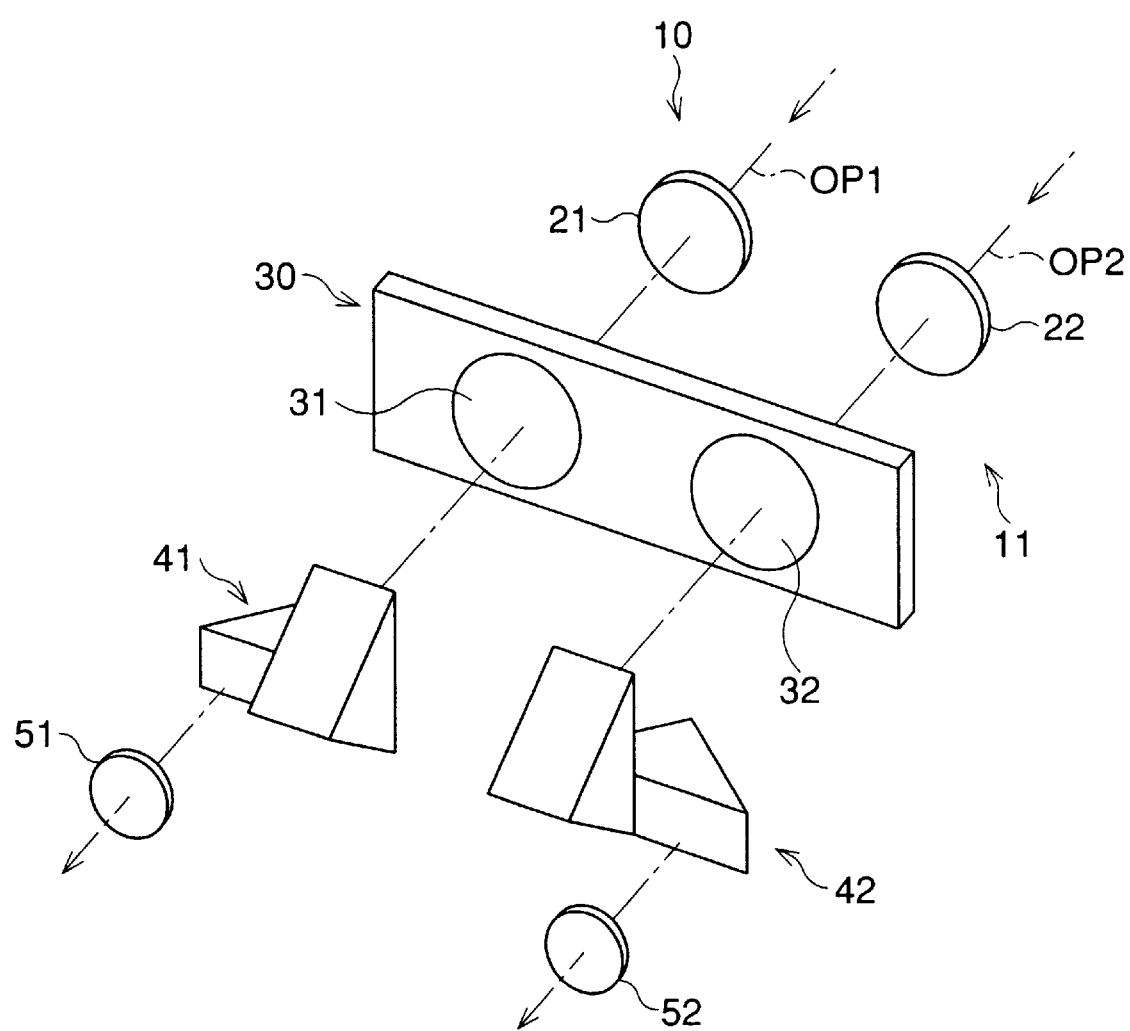
FIG. 1 is a conceptional view showing positional relationships between optical systems of binoculars to which an embodiment according to the present invention is applied.

The present invention will now be described with reference to embodiments shown in the drawings.

FIG. 1 is a conceptional view showing positional relationships between optical systems of binoculars to which a first embodiment, according to the present invention, is applied. In a first optical system 10, after passing through a first objective lens 21 and a first correction lens 31, reflected light from an object (not shown) is directed to a first eyepiece 51 through a first erecting prism 41. In a second optical system 11, after passing through a second objective lens 22 and a second correction lens 32, the reflected light is directed to a second eyepiece 52 through a second erecting prism 42.

The first and second correction lenses 31 and 32 are unitarily supported by a lens supporting frame 30. The relational position between each element of the first and second optical systems 10 and 11 is adjusted, such that an optical axis OP1 of the first optical system 10 and an optical axis OP2 of the second optical system 11 are aligned in parallel.

Note that, in this specification, a "lateral direction" means a direction parallel to a standard plane on which the optical axes OP1 and OP2 lie, being perpendicular to the optical axes OP1 and OP2, and a "lengthwise direction" means a direction perpendicular to the standard plane. Namely, while the binoculars are held in a standard position, the lateral direction corresponds to a horizontal direction and the lengthwise-direction corresponds to a vertical direction.

Further, a "lengthwise-direction moving center position" means a position of the lens supporting frame 30 when optical axes of the correction lenses 31 and 32 lie on the standard plane. Furthermore, a "lateral-direction moving center position" means a position of the lens supporting frame 30 when the optical axis of the correction lens 31 lies on a plane, which is perpendicular to the standard plane and on which the optical axis OP1 lies, and the optical axis of the correction lens 32 lies on a plane which is perpendicular to the standard plane and on which the optical axis OP2 lies.

Namely, when the lens supporting frame 30 is disposed at the lengthwise-direction moving center position and also at the lateral-direction moving center position, the optical axes of the correction lenses 31 and 32 are respectively coaxial with the optical axes OP1 and OP2.

Figure 2:
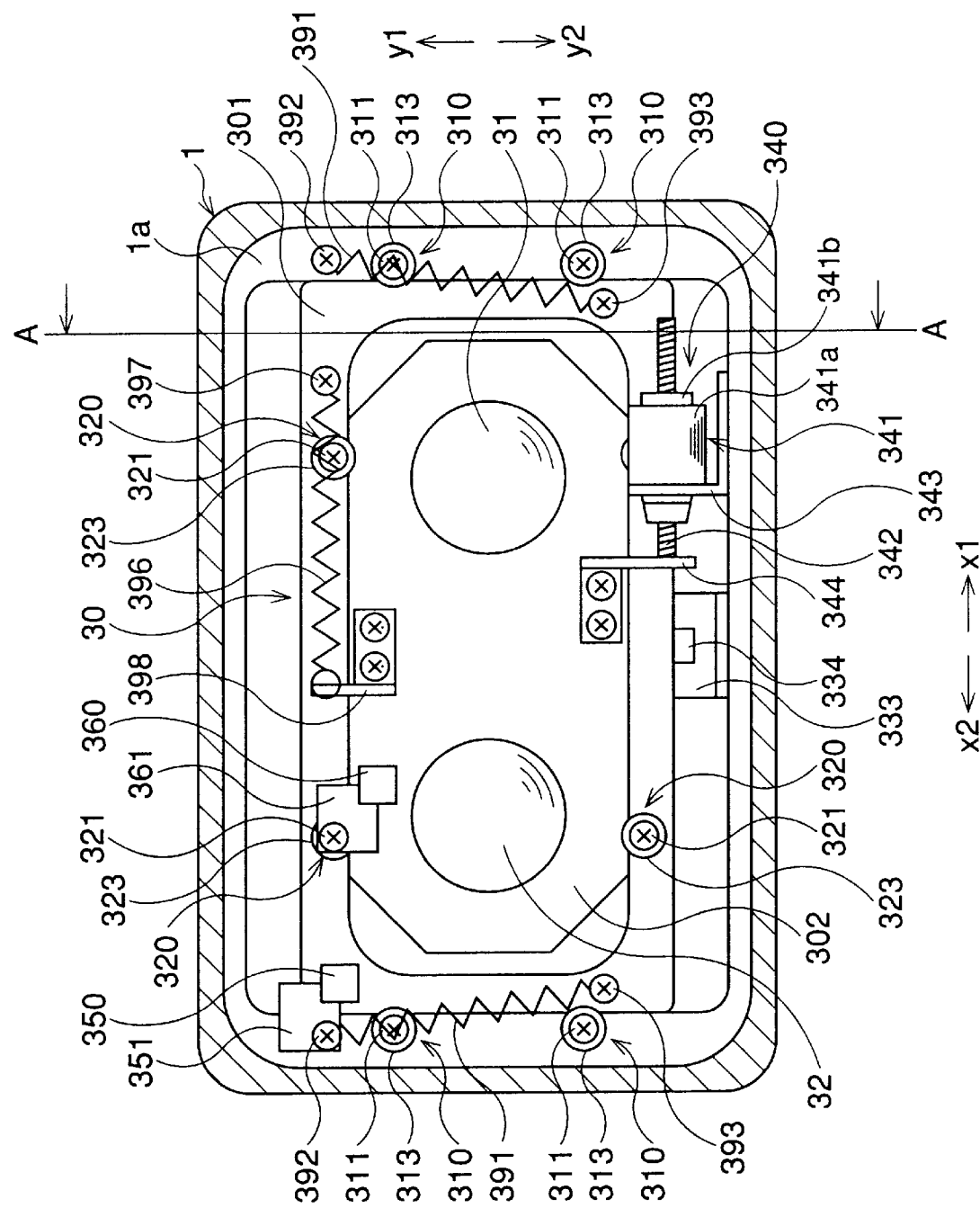
FIG. 2 is a front view of a lens supporting frame of the embodiment.

FIG. 2 is a front view of the lens supporting frame 30, viewed from the side of the first and second objective lenses 21 and 22. The lens supporting frame 30 includes a lengthwise-direction driving frame 301 and a lateral-direction driving frame 302. The lengthwise-direction driving frame 301 is a flat board. A through-hole opening is formed in a center of the driving frame 301. Namely, the driving frame 301 is a doughnut-shaped board. The driving frame 301 is supported by holding members 310 mounted on a flange 1a, which is unitarily formed on an inner wall 1 of the binoculars, to be slidable in the lengthwise direction so that the driving frame 301, when driven, is led in the lengthwise direction.

The driving frame 302 is a flat board which unitarily holds the correction lenses 31 and 32, and is disposed in the through-hole opening of the driving frame 301. The driving frame 302 is supported by holding members 320 mounted on the driving frame 301, and is slidable in the lateral direction so that the driving frame 302, when driven, is led in the lateral direction.

Figure 3:
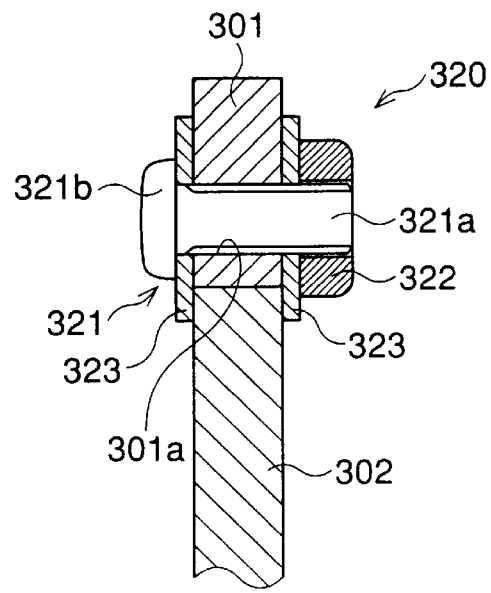
FIG. 3 is an enlarged sectional side view of a holding member.

FIG. 3 is a sectional side view of the holding member 320. The holding member 320 comprises a screw 321, a nut 322 and a pair of washers 323. A shaft 321a of the screw 321 is received in a hole 301a formed in the lengthwise-direction driving frame 301. A thread is formed on the shaft 321a. The nut 322 is threadingly engaged on a free end of the shaft 321a, opposite a head 321b of the screw 321. One washer 323 is mounted between the head 321b and the driving frame 301, and another washer 323 is mounted between the nut 322 and the driving frame 301.

The radii of the washers 323 are greater than the length between a side surface of the driving frame 301, which is in contact with the side surface of the lateral-direction driving frame 302 and a longitudinal central axis of the shaft 321a. Namely, a perimeter portion of the driving frame 302 is lightly clamped by the pair of the washers 323, such that the driving frame 302 is unable to move in a direction parallel to the optical axes OP1 and OP2.

The holding member 310 (see FIG. 2) has a similar construction to that of the holding member 320. A shaft of a screw 311 is received in a hole formed in the flange 1a, and a nut (omitted in FIG. 2) is threadingly engaged on a free end of the shaft, opposite a head of the screw 311. One washer 313 (see FIG. 2) is mounted between the head of the screw 311 and the flange 1a, and another washer (not shown) is mounted between the nut and the flange 1a. A perimeter of the lengthwise-direction driving frame 301 is lightly clamped by the washers 313. Namely, similarly to the lateral-direction driving frame 302, the lengthwise-direction driving frame 301 is held by the washers 313 so as not to move in a direction parallel to the optical axes OP1 and OP2.

The perimeter of the lengthwise-direction driving frame 301, mounted in the flange 1a, is lightly clamped by the pair of washers 313 of the holding member 310, with the perimeter portion of the driving frame 302, mounted in the opening of the frame 301, being lightly clamped by the pair of the washers 323 of the holding member 320. Namely, the flange 1a and the frames 301, 302 are formed so that the thickness of the flange 1a, along the optical axes OP1 and OP2, is larger than the thickness of the frame 301, along the optical axes OP1, OP2, and the thickness of the frame 301 is larger than the thickness of the frame 302, along the optical axes OP1 and OP2.

Further, a difference between the thickness of the flange 1a and the thickness of the driving frame 301 is small, such that the movement of the driving frame 301 in the lengthwise direction is unaffected by friction between the pair of washers 313 and the driving frame 301, and the movement of the driving frame 301 parallel to the optical axes OP1 and OP2 is negligible.

Furthermore, a difference between the thickness of the driving frame 301 and the thickness of the driving frame 302 is small, such that the movement of the driving frame 302 in the lateral direction is unaffected by friction between the pair of washers 323 and the driving frame 302, and the movement of the driving frame 302 parallel to the optical axes OP1, OP2 is negligible.

Figure 4:
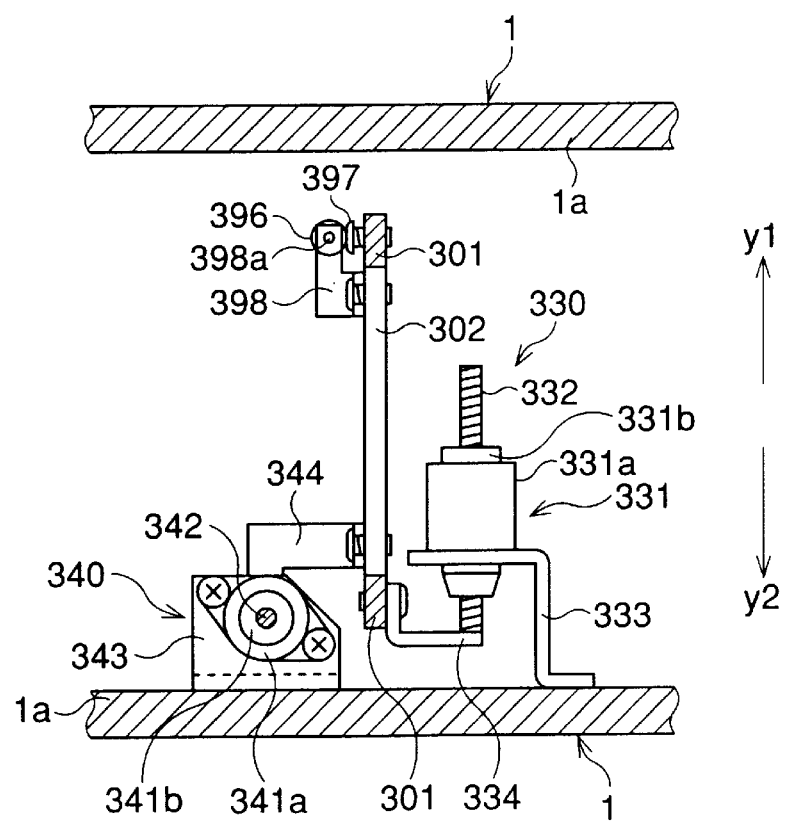
FIG. 4 is a sectional side view of the lens supporting frame of the embodiment.

FIG. 4 is a sectional side view taken in the direction of the arrows substantially along the line A—A of FIG. 2. Actuators of this embodiment will be explained, with reference to FIGS. 2 and 4.

A lengthwise-direction actuator, generally indicated by reference 330, is placed at a center portion of the driving frames 301 and 302, on a side of the first and second erecting prisms 41 and 42 (see FIG. 1). The lengthwise-direction actuator 330 comprises a stepping motor 331 and a shaft 332. The stepping motor 331 comprises a motor case 331a and a motor 331b which is mounted in the motor case 331a.

The motor 331b can rotate in forward and reverse directions around a lengthwise direction axis. The shaft 332 is supported so as to be unitarily rotatable with the rotational movement of the motor 331b and movable along the longitudinal axis thereof. A thread is formed on the outer surface of the shaft 332, and the shaft 332 is engaged with a female thread (omitted in FIGS. 2 and 4) formed on the inner surface of a quill of the motor case 331a. Namely, the shaft 332 rotatably extends or retracts in the longitudinal direction, in accordance with the rotational direction, forward and reverse, of the motor 331b.

The motor case 331a is fixed at the flange 1a by a first fixing member 333. A bowl is mounted on the tip of the shaft 332. The bowl of the shaft 332 abuts a first pressed member 334 fixed at the lower portion of the lengthwise-direction driving frame 301.

First coil springs 391 are disposed close to the side end of the frame 301, on a side of the first and second objective lenses 21 and 22 (see FIG. 1). Both ends of the first coil spring 391 are respectively hook-shaped. One end is hooked with a screw 392 which is engaged with a portion of the flange 1a close to the upper side thereof, and another end is engagedly hooked on a screw 393 which is engaged with a portion of the frame 301 close to a lower side thereof. Namely, the first coil springs 391 urge the frame 301 in the direction y1. Accordingly, the bowl of the shaft 332 contacts the first pressed member 334 at all times.

A lateral-direction actuator, generally indicated by reference 340, is placed at a portion close to the lower side of the driving frames 301 and 302, on a side of the first and second objective lenses 21 and 22 (see FIG. 1), being also disposed on a side of the first correction lens 31 viewed from a center axis of the frames 301 and 302 along the lengthwise direction. The lateral-direction actuator 340 comprises a stepping motor 341 and a shaft 342. The stepping motor 341 comprises a motor case 341a and a motor 341b, which is mounted in the motor case 341a.

The motor 341b can rotate in forward and reverse directions around a lateral direction axis. The shaft 342 is supported so as to be unitarily rotatable with the rotational movement of the motor 341b and movable along the longitudinal axis thereof. A thread is formed on the outer surface of the shaft 342, and the shaft 342 is engaged with a female thread (omitted in FIGS. 2 and 4) formed on the inner surface of a quill of the motor case 341a. Namely, the shaft 342 rotatably extends or retracts in the longitudinal direction, in accordance with the rotational direction, forward and reverse, of the motor 341b.

The motor case 341a is fixed at the flange 1a by a second fixing member 343. A bowl (not shown) is mounted on the tip of the shaft 342. The bowl of the shaft 342 abuts (but is not fixedly mounted to) a second pressed member 344, the pressed member being affixed to the lower portion of the lateral-direction driving frame 302.

A second coil spring 493 is disposed at the upper portion of the frame 302, on a side of the first and second objective lenses 21 and 22 (see FIG. 1). Both ends of the second coil spring 396 are respectively hook-shaped. One end is engagedly hooked on a screw 397 which is engaged with a portion of the upper end of the frame 301, on the side at which the first correction lens 31 is placed. Another end is engagedly hooked on a hole 398a formed in a flange 398, which is fixed at a central portion of the frame 302, at the upper end thereof. Namely, the second coil spring 396 urges the frame 302 in the direction x1, thereby biasing the second pressed member 344 against the bowl of the shaft 342.

When the motor 331b rotates in the forward direction, the shaft 332 rotatably extends in the direction y2 (the downward direction). The movement of the shaft 332 in the direction y2 is transmitted to the lengthwise-direction driving frame 301 through the first pressed member 334. As described above, the frame 301 is slidably supported by the flange 1a, so that the frame 301 is driven in the direction y2, in accordance with the rotational movement of the motor 331b, resisting the spring force of the first coil springs 391 in the direction y1. On the other hand, when the motor 331b rotates in the reverse direction, the shaft 332 rotatably retracts in the direction y1 (the upward direction), so that the frame 301 is driven in the direction y1 by the spring force of the first coil springs 391. During movement of the frame 301 in the y1-y2 direction, the pressed member 334 engages and is slidable with respect to the bowl of the shaft 342 in the y1-y2 direction.

When the motor 341b rotates in the forward direction, the shaft 342 rotatably extends in the direction x2 (the left direction in FIG. 2). The movement of the shaft 342 in the direction x2 is transmitted to the lateral-direction driving frame 302 through the pressed member 344. As described above, the frame 302 is slidably supported by the frame 301, so that the frame 302 is driven in the direction x2, in accordance with the rotational movement of the motor 341b, resisting the spring force of the second coil spring 396 in the direction x1. On the other hand, when the motor 341b rotates in the reverse direction, the shaft 342 rotatably retracts in the direction x1 (the right direction in FIG. 2), so that the frame 302 is driven in the direction x1 by the spring force of the second coil spring 396.

The thread of the shaft 332 is appropriately manufactured, such that the motor 331b will not unexpectedly rotate under by externally applied forces, to allow secure engagement between the thread of the shaft 332 and the female thread of the motor case 331a while the power supply is stopped. Similarly, the thread of the shaft 342 is appropriately manufactured, such that the motor 341b will not unexpectedly rotate by externally applied forces, to allow secure engagement between the thread of the shaft 342 and the female thread of the motor case 341a while the power supply is stopped.

As shown in FIG. 2, a lateral-direction reset position detecting sensor 360 is fixed in close proximity to the second correction lens 32 at an upper portion of the lateral-direction driving frame 302. The sensor 360 is a transmission-type photo-interrupter. A lateral-direction reset position detecting plate 361 is fixed by the screw 321, in close proximity to the second correction lens 32 at an upper portion of the lengthwise-direction driving frame 301. The detecting plate 361 is a thin plate.

Figure 5:
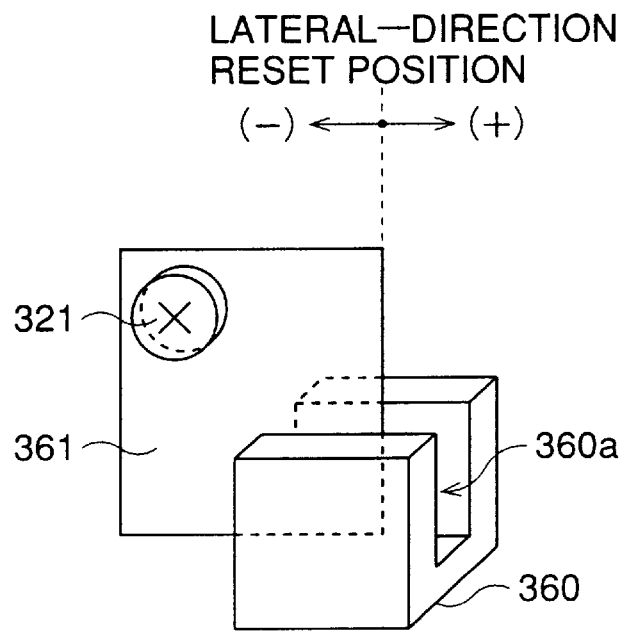
FIG. 5 is a conceptional view showing a positional relationship between a reset position detecting sensor and a reset position detecting plate.

FIG. 5 indicates a positional relationship between the lateral-direction reset position detecting sensor 360 and the lateral-direction reset position detecting plate 361. The sectional shape of the sensor 360 is a hollow-shaped. The sensor 360 includes a light-emitting element and a photo-receptor element (omitted in FIG. 5), facing each other with a space 360a therebetween. The detecting plate 361 is interposed in the space 360a. In accordance with the movement of the lateral-direction driving frame 302, the sensor 360, fixed on the frame 302, moves, so that the position of the detecting plate 361 in the space 360a changes, causing a change in voltage output from the sensor 360.

In this embodiment, the sensor 360 and the detecting plate 361 are mounted such that the voltage output from the sensor 360 changes when the driving frame 302 is positioned at the lateral-direction moving center position. Note that, the position of the driving frame 302, when the voltage output from the sensor 360 changes, is referred to as "the lateral-direction reset position". In other words, from the view point of design, when the driving frame 302 is positioned at the lateral-direction moving center position, the driving frame 302 is also positioned at the lateral-direction reset position. Namely, the lateral-direction reset position coincides with the lateral-direction moving center position.

Figure 6:
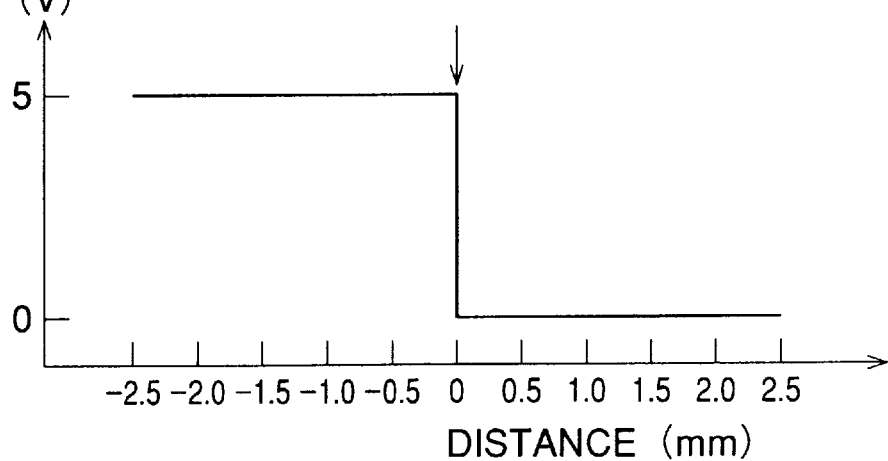
FIG. 6 is a graph indicating an output signal from the reset position detecting sensor.

FIG. 6 is a graph indicating an output signal from the by lateral-direction reset position detecting sensor 360. When the driving frame 302 is shifted in the direction x2 (see FIG. 2) from the lateral-direction reset position, namely, when the detecting plate 361 is shifted to a + (plus) side in FIG. 5, a luminance flux, emitted from the light-emitting element, is intercepted by the detecting plate 361, so that the luminance flux is blocked from the photoreceptor element. Accordingly, the voltage output from the sensor 360 is "0" volts. On the other hand, when the driving frame 302 is shifted in the direction x1 (see FIG. 2) from the lateral-direction reset position, namely, when the detecting plate 361 is shifted to a − (minus) side in FIG. 5, the luminance flux is not intercepted by the detecting plate 361, and the luminance flux is inputted to the photoreceptor element. Accordingly, the voltage output from the sensor 360 is "5" volts.

Therefore, it can be checked whether the driving frame 302 is positioned at the lateral-direction reset position, by detecting the change of voltage output from the sensor 360, being from 0 volts to 5 volts, or from 5 volts to 0 volts.

As shown in FIG. 2, a lengthwise-direction reset position detecting sensor 350 is fixed on an upper portion of a left end of the lengthwise-direction driving frame 301. Similarly to the sensor 360, the sensor 350 is a transmission-type photo-interrupter, including a light-emitting element and a photo-receptor element (not shown), facing each other with a predetermined space therebetween. A lengthwise-direction reset position detecting plate 351 is fixed on an upper portion of the left end of the flange 1a. Similarly to the detecting plate 361, the detecting plate 351 is a thin plate. The detecting plate 351 is interposed between the light-emitting element and the photo-receptor element of the sensor 350. In accordance with a change in the positional relationship between the sensor 350 and the detecting plate 351, caused by the movement of the frame 301, a voltage signal outputted from the sensor 350 changes.

In this embodiment, the sensor 350 and the detecting plate 351 are mounted such that the voltage output from the sensor 350 changes when the driving frame 301 is positioned at the lengthwise-direction moving center position. Note that, the position of the driving frame 301, when the voltage output from the sensor 350 changes, is referred to as "the lengthwise-direction reset position". Namely, the lengthwise-direction reset position coincides with the lengthwise-direction moving center position.

When the driving frame 301 is shifted in the direction y2 (see FIG. 2) from the lengthwise-direction reset position, a luminance flux, emitted from the light-emitting element of the sensor 350, is not intercepted by the detecting plate 351, so that the luminance flux is inputted to the photoreceptor element of the sensor 350. Accordingly, the voltage output from the sensor 350 is "5" volts. On the other hand, when the driving frame 301 is shifted in the direction y1 (see FIG. 2) from the lengthwise-direction reset position, the luminance flux is intercepted by the detecting plate 351 and not inputted to the photoreceptor element. Accordingly, the voltage output from the sensor 350 is "0" volts.

Namely, similarly to checking the lateral-direction reset position, it can be checked whether the driving frame 301 is positioned at the lengthwise-direction reset position, by detecting the change of voltage output from the sensor 350, being from 0 volts to 5 volts, or from 5 volts to 0 volts.

As described above, in this embodiment, the lengthwise-direction driving frame 301 and the lateral-direction driving frame 302 are united in the lens holding frame 30. Further, a driving mechanism of the correction lenses 31, 32, including the direct-drive mechanisms, the reset position detecting sensors 350, 360 and the reset position detecting plates 351, 361, is formed as one unit. Accordingly, the driving mechanism is easily mountable in the binoculars.

In the reset position detecting mechanisms (350, 351, 360, 361) of this embodiment: the reset position detecting plate 351 is fixed on the flange 1a which is unmovable in the lengthwise direction and the transmission-type photo-interrupter 350 is fixed on the driving frame 301, which is movable in the lengthwise direction; and the reset position detecting plate 361 is fixed on the driving frame 301, which is unmovable in the lateral direction and the transmission-type photo-interrupter 360 is fixed on the driving frame 302, which is movable in the lateral direction.

However, it is possible to reverse the positional relationships between the reset position detecting plates (351, 361) and the transmission-type photo-interrupters (350, 360). The transmission-type photo-interrupter 350 may be fixed on the flange 1a and the reset position detecting plate 351 may be fixed on the driving frame 301, such that the reset position detecting plate 351 moves with the driving frame 301. Also, the transmission-type photo-interrupter 360 may be fixed on the driving frame 301 and the reset position detecting plate 361 may be fixed on the driving frame 302, such that the reset position detecting plate 361 moves with the driving frame 302.

Namely, the reset position detecting mechanisms (350, 351, 360, 361) may have such a construction that the positional relationship between the reset position detecting plates (351, 361) and the transmission-type photo-interrupters (350, 360) are changed with respect to the driving frame utilized (301, 302), whereby the output signal of the transmission-type photo-interrupters (350, 360) change accordingly.

Further, in this embodiment, the transmission-type photo-interrupters (350, 360) are utilized as the reset position detecting sensors. However, reflection-type photo-interrupters (photo-reflectors), in which a photo-receptor element detects reflected light from an object, can be utilized. The photoreceptor elements and light-emitting elements are disposed such that a light emitting surface of the light-emitting elements and a light receiving surface of the photoreceptor elements face in a same direction, and reset position detecting plates are respectively placed, facing the light emitting surfaces and the light receiving surfaces. The positional relationship between the reflection-type photo-interrupters and the reset position detecting plates is confirmed based on whether light emitted from the light-emitting elements is incident on the photo-receptor elements. Accordingly, it is thus judged whether the driving frames (301, 302) are at the reset positions.

Furthermore, similar to the case in which the transmission-type photo-interrupters (350, 360) are utilized, the reflection-type photo-interrupters and the plates may be disposed such that the positional relationships between the reflection-type photo-interrupters and the plates change with respect to the driving frame utilized (301, 302).

Namely, with respect to the reset position detecting mechanism in the lengthwise direction, the plates may be fixed on the flange 1a and the reflection-type photo-interrupter may be fixed on the driving frame 301; or the plates may be fixed on the driving frame 301 and the reflection-type photo-interrupter may be fixed on the flange 1a. Also, with respect to the reset position detecting mechanism in the lateral direction, the plates may be fixed on the driving frame 301 and the reflection-type photo-interrupter may be fixed on the driving frames 302; or the plates may be fixed on the driving frame 302 and the reflection-type photo-interrupter may be fixed on the driving frame 301.

Figure 7:
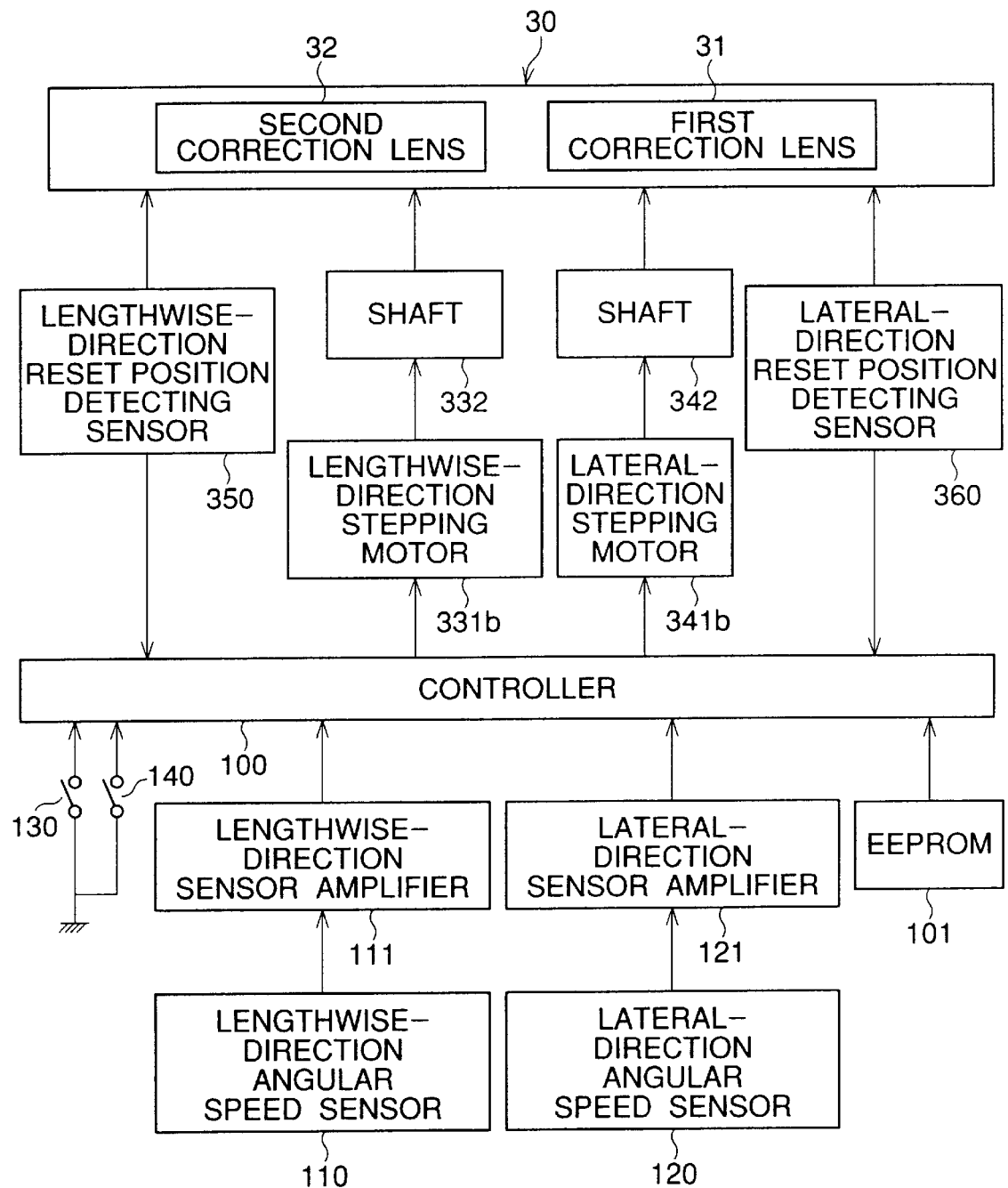
FIG. 7 is a block diagram of a tremble preventing apparatus of the embodiment.

FIG. 7 is a block diagram of the tremble preventing device of this embodiment.

A lengthwise-direction angular speed sensor 110 detects a vector and an angular speed of a trembling in the lengthwise direction, and a lateral-direction angular speed sensor 120 detects a vector and an angular speed of a trembling in the lateral direction, while the binoculars are being held by a user.

A lengthwise-direction sensor amplifier 111 is connected to the angular speed sensor 110, amplifying the lengthwise-direction angular speed outputted from the angular speed sensor 110. The amplified lengthwise-direction angular speed, outputted from the sensor amplifier 111, is inputted to a controller 100. The controller 100 is, for example, a micro computer. Similarly, a lateral-direction sensor amplifier 121 is connected to the angular speed sensor 120, amplifying the lateral-direction angular speed outputted from the angular speed sensor 120. The amplified lateral-direction angular speed outputted from the sensor amplifier 121 is inputted to the controller 100.

In the controller 100, the lengthwise-direction angular speed and the lateral-direction angular speed are respectively converted to digital values, based on a predetermined synchronous signal. Each digital value is subjected to integration, so that a lengthwise-direction angular displacement signal and a lateral-direction angular displacement signal, respectively corresponding to an amount of hand tremble in each of the directions, are calculated. Based on the lengthwise-direction angular displacement signal, a lengthwise-direction driving amount of the lens supporting frame 30 in a plane perpendicular to the optical axes OP1 and OP2, i.e. a driving step number of the motor 331b of the lengthwise-direction actuator 330 (pulse number inputted to the motor 331b), is calculated. Similarly, based on the lateral-direction angular displacement signal, a lateral-direction driving amount of the lens supporting frame 30 in a plane, i.e. a driving step number of the motor 341b of the lateral-direction actuator 340 (pulse number inputted to the motor 341b), is calculated.

The motor 331b of the lengthwise-direction actuator 330 is rotated based on the pulse number outputted from the controller 100. The rotational motion of the motor 331b is transmitted to the lens supporting frame 30 through the shaft 332, so that the lens supporting frame 30 is moved in the lengthwise-direction. Similarly, the motor 341b of the lateral-direction actuator 340 is rotated based on the pulse number outputted from the controller 100. The rotational motion of the motor 341b is transmitted to the lens supporting frame 30 through the shaft 342, so that the lens supporting frame 30 is moved in the lateral-direction.

The lengthwise-direction reset position detecting sensor 350 and the lateral-direction reset position detecting sensor 360 are connected to the controller 100. When the lens supporting frame 30 is placed at the lengthwise-direction reset position, the signal output from the reset position detecting sensor 350 changes. When the lens supporting frame 30 is placed at the lateral-direction reset position, the signal output from the reset position detecting sensor 360 changes. Both signals are inputted to the controller 100. The controller 100 judges whether the lens supporting frame 30 is placed at the lengthwise-direction and lateral-direction reset positions, by detecting the change of each signal.

Further, an EEPROM 101 is connected to the controller 100. The EEPROM 101 a nonvolatile memory which is erasable and programable. The differences between the reset position and the moving center position, with respect to the lengthwise direction and the lateral direction, are stored in the EEPROM 101. As described above, from the viewpoint of design, the lengthwise-direction reset position coincides with the lengthwise-direction moving center position, and the lateral-direction reset position coincides with the lateral-direction moving center position. However, the differences are generated due to, for example, a tolerance in processing. Therefore, after reading the differences stored in the EEPROM 101, the controller 100 outputs predetermined pulse numbers to the motors 331*b* and 341*b* based on the differences, such that the lens supporting frame 30 is moved from the reset position to the moving center position with respect to the lengthwise direction and the lateral direction.

A power switch 130 is connected to the controller 100. When the power switch 130 is turned ON, a power is supplied from a battery (not shown) to electric circuits including the above-mentioned sensors through the controller 100. When the power switch 130 is turned OFF, the power supply from the battery is stopped, and the lens supporting frame 30 is moved to the moving center position, as described below. After lens supporting frame 30 reaches the moving center position, the lens supporting frame 30 is unable to be driven, being fixed at the moving center position, until the power switch 130 is turned ON again.

A tremble preventing switch 140 is connected to the controller 100. When the tremble preventing switch 140 is turned ON, the driving of the correction lenses 31 and 32 is started, and while the tremble preventing switch 140 is ON, the driving of the correction lenses 31 and 32 is performed, so that a tremble preventing operation is performed.

Note that, the controller 100 is provided with a capacitor (not shown), in which electric power, enough for completing the moving of the lens supporting frame 30 to the moving center position after the power switch 130 is turned OFF, is accumulated.

Figure 8:
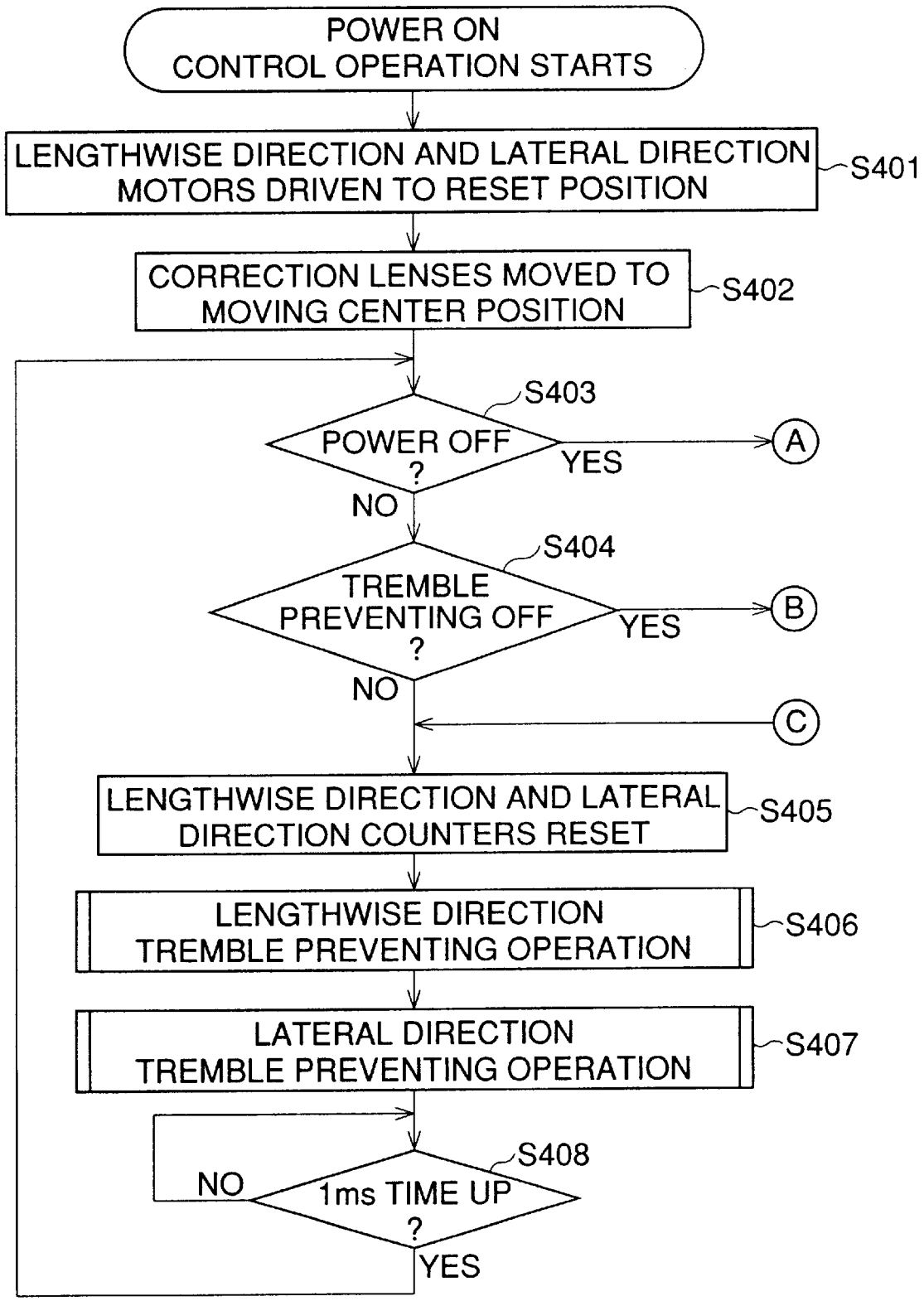
FIG. 8 is a flowchart of a main routine of a tremble preventing operation of the embodiment.

A process of the tremble preventing operation of this embodiment will now be explained, with reference to FIGS. 8 through 10. FIG. 8 is a flowchart of a main routine of the tremble preventing operation of this embodiment, FIG. 9 is a flowchart indicating a procedure in the main routine for powering OFF the binoculars, and FIG. 10 is a flowchart indicating a procedure in the main routine for turning OFF a tremble-preventing-switch.

In FIG. 8, when the power switch 130 of the binoculars is pressed and power is supplied to the controller 100, the main routine is started. In step S401, the motor 331*b* of the lengthwise-direction actuator 330 and the motor 341*b* of the lateral-direction actuator 340 are driven such that the lengthwise-direction driving frame 301 and the lateral-direction driving frame 302 are respectively disposed at the reset positions. Then, in step S402, the differences between the reset positions and the moving center positions are read out from the EEPROM 101, and the motors 331*b* and 341*b* are driven based on the differences, so that the driving frame 301 is moved to be disposed at the lengthwise-direction moving center position and the driving frame 302 is moved to be disposed at the lateral-direction moving center position.

Then, in step S403, the state of the power switch 130 is detected. If the power switch 130 is OFF, the process goes to the procedure of FIG. 9.

Figure 9:
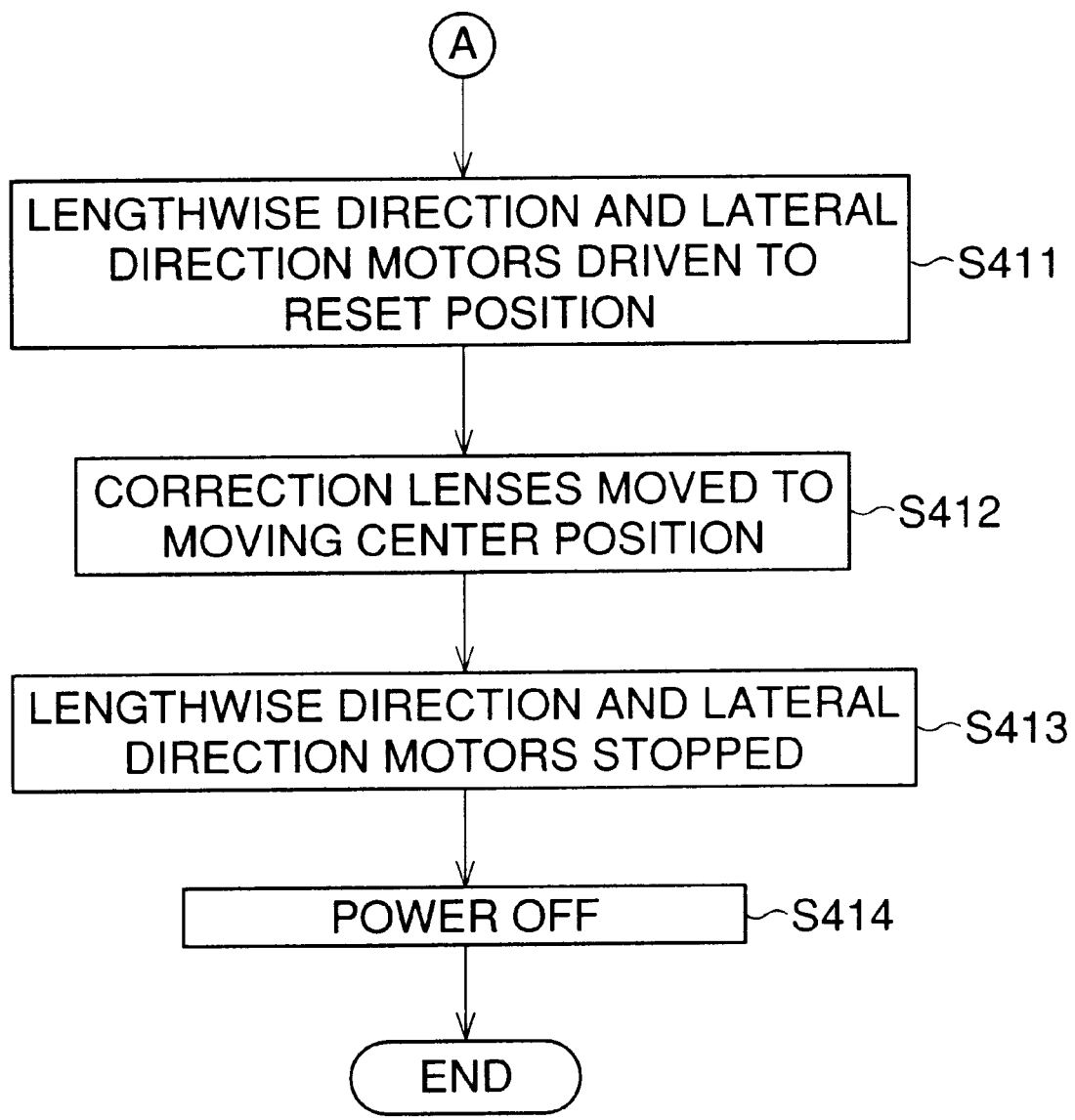
FIG. 9 is a flowchart indicating a procedure in the main routine for powering off the optical device.
Figure 10:
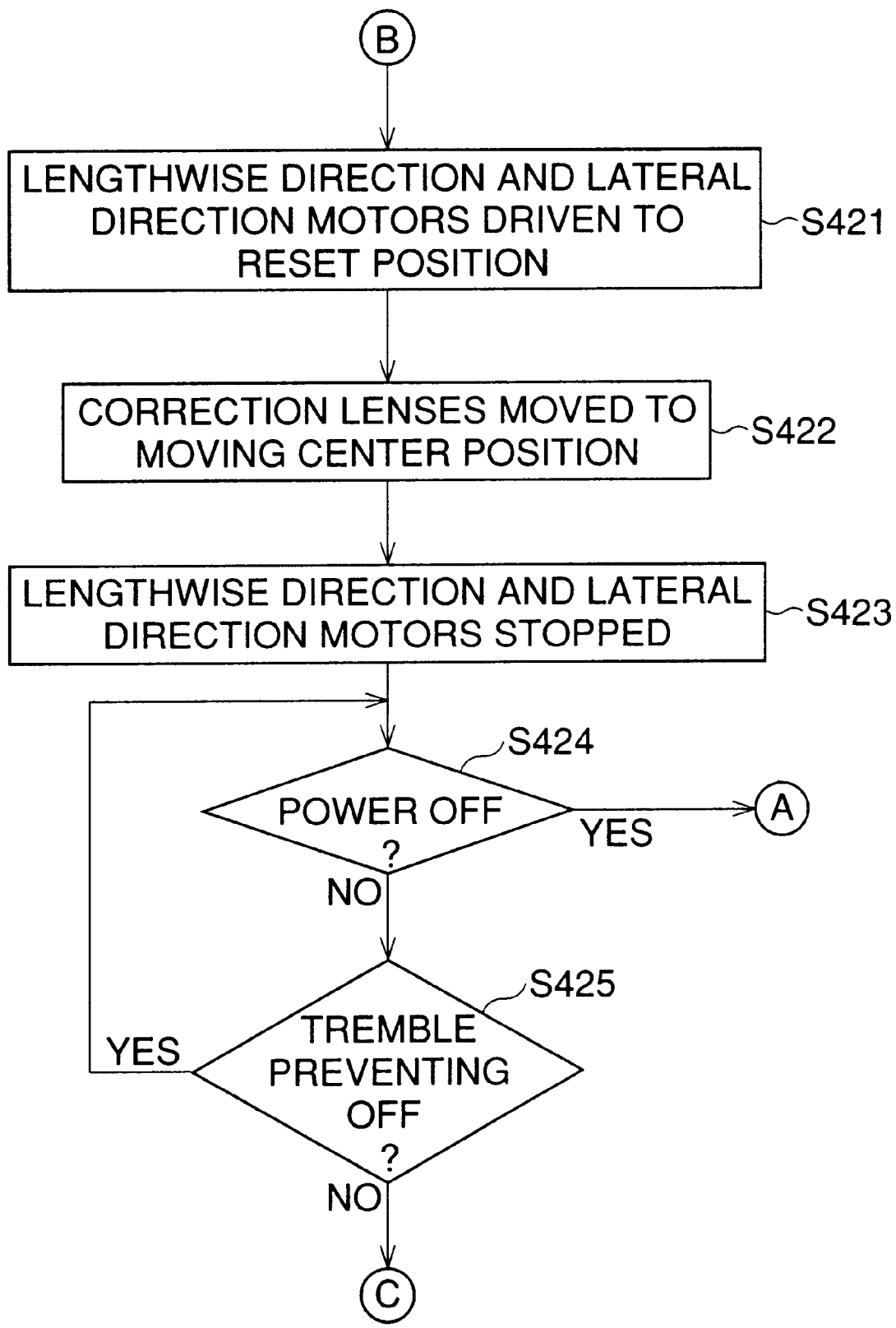
FIG. 10 is a flowchart indicating a procedure in the main routine for turning off a tremble-preventing-switch.

In FIG. 9, in step S411, the motors 331*b* and 341*b* are respectively driven such that the lengthwise-direction driving frame 301 and the lateral-direction driving frame 302 are respectively disposed at the reset positions.

In step S412, the motors 331*b* and 341*b* are respectively driven based on the differences between the reset positions and the moving center positions read out from the EEPROM 101, so that the driving frame 301 is driven to the lengthwise-direction moving center position and the driving frame 302 is driven to the lateral-direction moving center position. Then, in step S413, the motors 331*b* and 341*b* are stopped. In step S414, the supply of the power is stopped and the process ends.

On the other hand, if the power switch 130 is ON in step S403 of FIG. 8, the process goes to step S404. In step S404, the state of the tremble preventing switch 140 is detected. If the tremble preventing switch 140 is OFF, the process goes to the flowchart of FIG. 10. If the tremble preventing switch 140 is ON, the process goes to step S405.

In step S421 of FIG. 10, the motor 331*b* of the lengthwise-direction actuator 330 and the motor 341*b* of the lateral-direction actuator 340 are respectively driven such that the lengthwise-direction driving frame 301 and the lateral-direction driving frame 302 are respectively disposed at the reset positions. In step S422, similarly to the operation in step S412, the motors 331*b* and 341*b* are respectively driven, so that the driving frame 301 is driven to the lengthwise-direction moving center position and the driving frame 302 is driven to the lateral-direction moving center position.

In step S423, the motors 331*b* and 341*b* are stopped, then the process goes to the step S424. In step S424, the state of the power switch 130 is detected. If the power switch 130 is OFF, the process jumps to step S411 of FIG. 9 and the ending operation is performed as described above. If the power switch 130 is ON, the process goes to step S425. In step S425, the state of the tremble preventing switch 140 is detected. If the tremble preventing switch 140 is OFF, the process returns to step S424, and if the tremble preventing switch 140 is ON, the process goes to step S405 of FIG. 8. Namely, the operations of steps S424 and S425 are repeatedly performed, until the power switch 130 is OFF or the tremble preventing switch 140 is ON.

As described above, when it is judged that the tremble preventing switch 140 is ON in steps S404 of FIG. 8 or S425 of FIG. 10, the process goes to step S405 of FIG. 8. In step S405, a lengthwise-direction counter and a lateral-direction counter are set to "0".

When the motor 331*b* rotates in the forward direction, the step amount of the motor 331*b* is added to the value of the lengthwise-direction counter, and when the motor 331*b* rotates in the reverse direction, the step amount of the motor 331*b* is subtracted from the value of the lengthwise-direction counter.

When the motor 341*b* rotates in the forward direction, the step amount of the motor 341*b* is added to the value of the lateral-direction counter, and when the motor 341*b* rotates in the reverse direction, the step amount of the motor 341*b* is subtracted from the value of the lateral-direction counter.

Then, in step S406, a tremble preventing operation in the lengthwise direction is performed. The lengthwise-direction angular speed, outputted from the lengthwise-direction angular speed sensor 110, is converted to a digital data in the controller 100. The lengthwise-direction angular displacement is calculated by integrating the digital data. A driving pulse amount of the motor 331*b* of the lengthwise-direction actuator 330 is calculated based on the angular to displacement. When the motor 331*b* is rotated in the forward direction, the driving pulse amount is attached with a plus sign (+). When the motor 331*b* is rotated in the reverse direction, the driving pulse amount is attached with a minus sign (−).

Rotational movement of the motor 331*b* in the forward and reverse directions are repeatedly performed, until the driving pulse amount coincides with the lengthwise-direction counter. In accordance with the rotation of the motor 331*b*, the driving frame 301 is driven such that the tremble in the lengthwise direction of the binoculars is canceled, so that the tremble of the focused image is corrected in the lengthwise direction.

Then, in step S407, a tremble preventing operation in the lateral direction is performed. The operation in the lateral direction is performed similarly to the operation in the lengthwise direction. The lateral-direction angular speed, outputted from the lateral-direction angular speed sensor 120, is converted to a digital data in the controller 100. The lateral-direction angular displacement is calculated by integrating the digital data. A driving pulse amount of the motor 341b of the lateral-direction actuator 340 is calculated based on the angular displacement. When the motor 341b is rotated in the forward direction, the driving pulse amount is attached with a plus sign (+). When the motor 341b is rotated in the reverse direction, the driving pulse amount is attached with a minus sign (−).

Rotational movement of the motor 341b in the forward and reverse directions are repeatedly performed, until the driving pulse amount coincides with the lateral-direction counter. In accordance with the rotation of the motor 341b, the driving frame 302 is driven such that the tremble in the lateral direction of the binoculars is canceled, so that the tremble of the focused image is corrected in the lateral direction.

After the tremble preventing operations in the lengthwise and lateral directions of steps S406 and S407 end, in step S408, it is judged whether a predetermined time has passed. The operation of step S408 is repeatedly performed until the predetermined time passes. After the predetermined time passes, the operations from step S403 are performed. Accordingly, the tremble preventing operations of steps S406 and S407 are preformed once during the predetermined time. In this embodiment, the predetermined time is pre-set to 1 msec.

As described above, in this embodiment, the driving frames 301 and 302 are respectively driven to the moving center positions, not only before the tremble preventing operations but also when the power switch 130 is turned OFF. Accordingly, while the power supply is stopped, the object image viewed through the first and second eyepieces 51, 52 does not deviate from an optical axis of a lens barrel. Further, after the power switch 130 is turned ON, a time for the driving of the driving frames 301 and 302 to the reset positions (step S401) is minimized.

Further, just after the power switch 130 is turned ON, the driving frames 301 and 302 are respectively driven to the reset positions (step S401), and driven to the moving center positions (step S402). Accordingly, even if the motors 331b and 341b are unexpectedly rotated by externally applied forces during the power supply is stopped, the driving frames 301 and 302 are respectively disposed at the moving center positions at all times before the start of the tremble preventing operations.

Furthermore, the operations of steps S401 and S402 can be omitted, as the driving frames 301 and 302 are respectively driven to the moving center positions when the power switch 130 is turned ON. In this case, if the motors 331b and 341b are unexpectedly rotated while the power supply is stopped, the driving frames 301 and 302 are respectively driven to the moving center positions by turning ON the power switch 130 again after turning it OFF.

In this embodiment, when the tremble preventing switch 140 is turned OFF, the driving frames 301 and 302 are respectively driven to the moving center positions. Accordingly, the tremble preventing operation is able to start more quickly, after the tremble preventing switch 140 is turned ON again and the power switch 130 is ON.

As described previously, the motors 331b, 341b cannot be unexpectedly rotated while the power supply to the motors 331b, 341b is stopped, due to the secure engagement between the thread of the shaft 332 and the female thread of the motor case 331a and the secure engagement between the thread of the shaft 342 and the female thread of the motor case 341a. Accordingly, the lens supporting frame 30 is fixedly disposed at the moving center position, after the power switch 130 is turned OFF.

According to this embodiment, the driving frame 301 is supported by the flange 1a unitarily formed on the inner wall 1 of the binoculars. Namely, the body of the binoculars has a function of supporting the driving frame 301. Accordingly, a number of members in the binoculars can be lowered.

Note that, in this embodiment, the flange 1a can be an outer frame which is attachable to and removal from the body of the binoculars.

Further, according to this embodiment, the differences between the reset positions and the moving center positions are stored in the EEPROM 101. Namely, with respect to the differences, unique values can be set to each pair of binoculars, based on verification after manufacturing. Further, if the values alter after extended or prolonged utilization of the binoculars, the values may be updated by the manufacturer. Furthermore, as the stored differences are memorized after the power supply is stopped, it is unnecessary to provide a battery for back-up. Namely, the EEPROM is most suitable for a memory of the tremble preventing apparatus, in which the above-mentioned difference is stored.

According to the present invention, an optical device, by which an object image can be surely viewd in accordance with a direction of the lens barrel while the poser supply is stopped, can be obtained.

The present disclosure relates to subject matter contained in the following Japanese Patent Application No. 10-158835 (filed on Jun. 8, 1998), which is expressly incorporated herein, by reference, in its entirety.

What is claimed:

1. An optical device, provided with a tremble preventing function, comprises:
    a detector that detects an amount of an optical device tremble;
    a correcting optical system that corrects a tremble of a focused image due to said optical device tremble; and
    a driving system that drives said correcting optical system in two directions on a plane perpendicular to an optical axis of said correcting optical system, such that said optical device tremble amount is canceled when a tremble preventing operation is performed, said driving system maintaining a position of said correcting optical system when a power supply to said optical device is stopped;
    wherein said correcting optical system is driven to a moving center position such that said optical axis of said correcting optical system coincides with an optical axis of another optical system of said optical device, when said power supply to said optical device is stopped.

2. The optical device of claim 1, further comprising a reset position detector that detects whether said correcting optical system is positioned at a reset position at which said optical axis of said correcting optical system is substantially coaxial with said optical axis of said another optical system,
    wherein said correcting optical system is driven to said reset position, before being driven to said moving center position.

3. The optical device of claim 2, further comprising a memory system that stores difference data indicating a difference between said reset position and said moving center position.

4. The optical device of claim 3, wherein said correcting optical system is driven to said moving center position based on a comparison of said reset position detector and said difference data.

5. The optical device of claim 3, wherein said memory system is an erasable and programmable nonvolatile memory.

6. The optical device of claim 3, wherein each of said two directions has said reset position detector, and said difference data of each of said two directions is stored in said memory system.

7. The optical device of claim 2, wherein each of said reset position detector comprises:
   a photo-interrupter that includes a light-emitting element and a photoreceptor element; and
   a thin plate;
   wherein a change of positional relationship between said photo-interrupter and said thin plate is detected based on, whether a luminance flux, outputted from said light-emitting element, is inputted to said photoreceptor element, or whether an amount of said luminance flux inputted to said photoreceptor element changes.

8. The optical device of claim 7, wherein said photo-interrupter is a transmission-type photo-interrupter in which said light-emitting element and said photoreceptor element are disposed facing each other separated by a predetermined interval, and said thin plate is interposed between said light-emitting element and said photoreceptor element.

9. The optical device of claim 8, wherein said thin plate is immovably fixed, and said photo-interrupter moves in accordance with said driving of said correcting optical system.

10. The optical device of claim 8, wherein said photo-interrupter is immovably fixed, and said thin plate moves in accordance with said driving of said correcting optical system.

11. The optical device of claim 7, wherein said photo-interrupter is a reflection-type photo-interrupter in which said light-emitting element and said photoreceptor element are disposed such that a light emitting surface of said light-emitting element and a light receiving surface of said photoreceptor element face substantially a same direction, and said thin plate faces said light emitting surface and said light receiving surface.

12. The optical device of claim 11, wherein said thin plate is immovably fixed, and said photo-interrupter moves in accordance with said driving of said correcting optical system.

13. The optical device of claim 11, wherein said photo-interrupter is immovably fixed, and said thin plate moves in accordance with said driving of said correcting optical system.

14. The optical device of claim 2, wherein said driving system comprises:
   a motor that is mounted in a motor case; and
   a shaft that moves in a longitudinal direction thereof, in accordance with a rotational direction of said motor, to move said correcting optical system;
   wherein a thread is formed on said shaft, and a female thread, that securely engages said shaft thread, is formed on an inner wall of said motor case, said motor being unable to rotate due to said secure engagement when said power supply to said optical device is stopped, so that said correcting optical system is fixedly disposed at said moving center position.

15. The optical device of claim 1, further comprising a tremble preventing switch that starts and ends said tremble preventing operation,
   wherein said correcting optical system is driven to said moving center position, when said tremble preventing switch is turned OFF.

16. An optical device provided with a tremble preventing function, comprises:
   a detector that detects an amount of an optical device tremble;
   a correcting optical system that corrects a tremble of a focused image due to said optical device tremble; and
   a driving system that drives said correcting optical system two-dimensionally on a plane perpendicular to optical axis of said correcting optical system;
   wherein said optical axis of said correcting optical system actually coincides with an optical axis of another optical system of said optical device, when a power supply to said optical device is stopped.

* * * * *